United States Patent
Nash et al.

[11] Patent Number: 6,105,487
[45] Date of Patent: Aug. 22, 2000

[54] COOKING APPLIANCE

[75] Inventors: Simon Nash, Bryanston; Richard Sparks, Blairgowrie; Peter Labuschagne, Florida; Edward Parrett, Randburg, all of South Africa

[73] Assignee: MTM Trading Limited, Roddepoort, South Africa

[21] Appl. No.: 09/104,026

[22] Filed: Jun. 24, 1998

[30] Foreign Application Priority Data

Jun. 24, 1997 [ZA] South Africa ............................. 97/5574
Jun. 24, 1997 [ZA] South Africa ............................. 97/5575
Jun. 24, 1997 [ZA] South Africa ............................. 97/5576

[51] Int. Cl.$^7$ ................................................ A47J 37/08
[52] U.S. Cl. ................................ 99/400; 99/401; 99/425; 99/423; 99/446; 99/447; 99/449; 126/9 R; 126/41 R
[58] Field of Search ............................. 99/449, 446, 447, 99/422, 393, 400, 401, 425; 126/41 R, 9 R, 25 R

[56] References Cited

U.S. PATENT DOCUMENTS

| 4,108,142 | 8/1978 | Barson et al. ......................... 126/41 R |
| 4,188,937 | 2/1980 | Baynes ................................... 126/41 R |
| 4,353,347 | 10/1982 | Seed ...................................... 126/41 R |
| 4,454,805 | 6/1984 | Matthews ................................ 99/446 X |
| 4,788,962 | 12/1988 | Mashburn et al. ................. 126/41 R X |
| 4,809,671 | 3/1989 | Vallejo, Jr. ........................ 126/41 R X |
| 5,582,094 | 12/1996 | Peterson et al. ...................... 99/446 X |

FOREIGN PATENT DOCUMENTS

| 30 17 583 A1 | 11/1980 | Germany . |
| 88 08 281 U | 10/1989 | Germany . |
| 910216 | 4/1991 | South Africa . |
| 959243 | 11/1995 | South Africa . |
| 2 050 149 | 1/1981 | United Kingdom . |

OTHER PUBLICATIONS

European Communciation dated Jul. 30, 1999.

*Primary Examiner*—Reginald L. Alexander
*Attorney, Agent, or Firm*—Fish & Richardson P.C.

[57] ABSTRACT

THE INVENTION provides a cooking appliance comprising a concave burner pan having a base and a peripheral side wall which together form a windshield and a gas burner disposed within the concavity of the pan, and an engagement formation adapted to mate with a corresponding engagement formation on a cooking surface, whereby such surface is releasably secured to the burner pan. A number of interchangeable cooking surfaces are disclosed which may be utilized in conjunction with the burner pan.

38 Claims, 18 Drawing Sheets

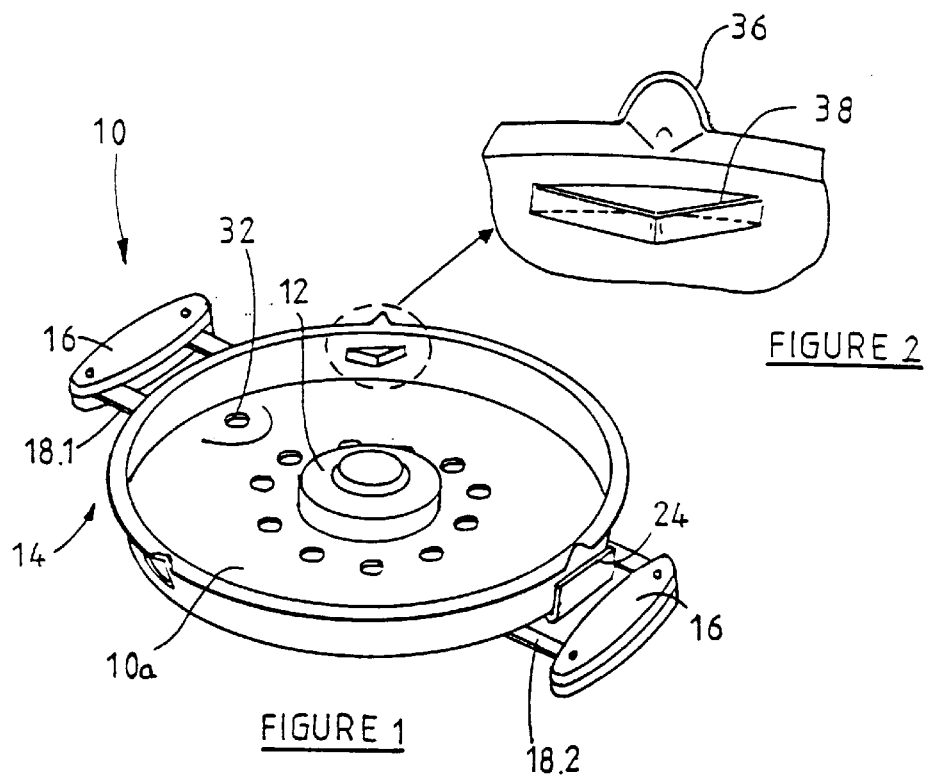
FIGURE 1
FIGURE 2
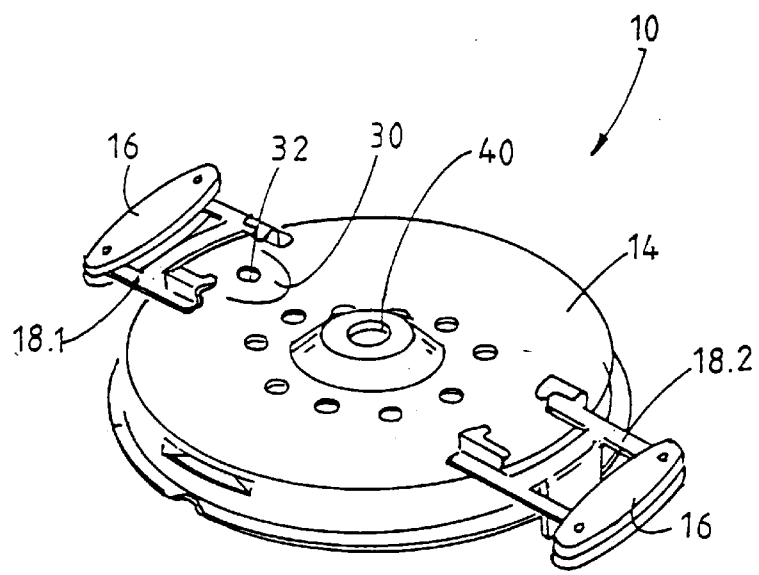
FIGURE 3

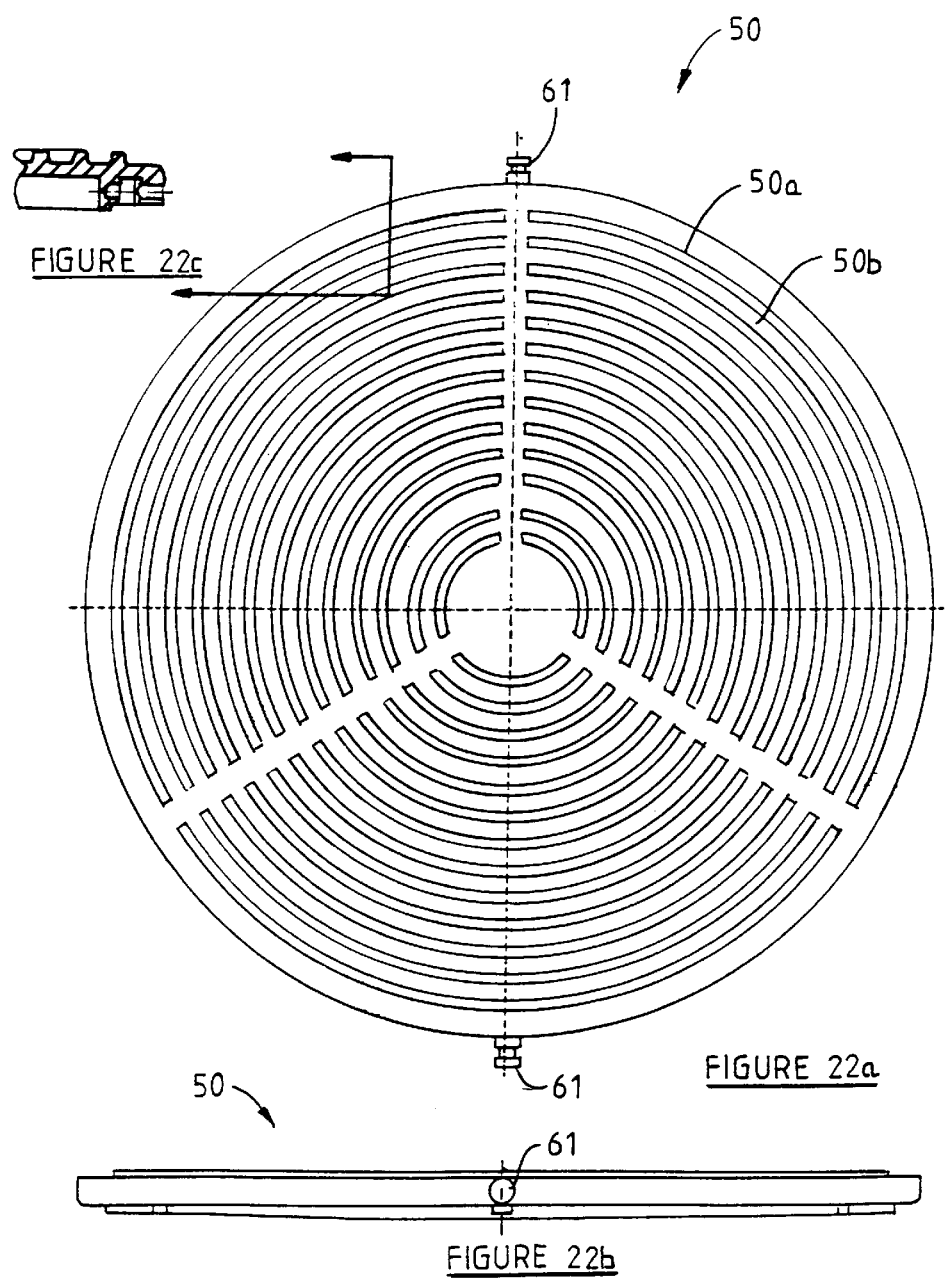

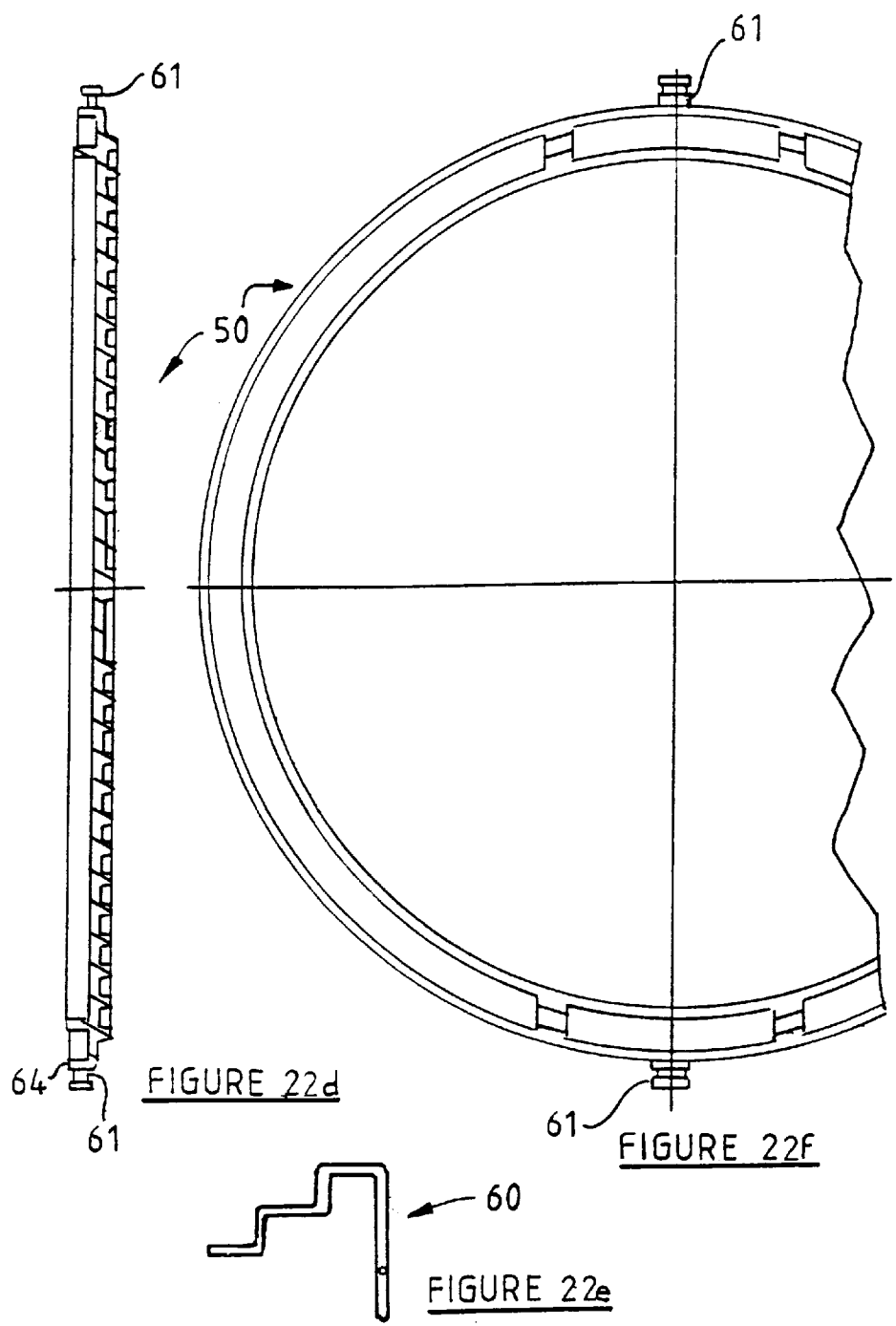

COOKING APPLIANCE

FIELD OF THE INVENTION

THIS invention relates to a gas cooking appliance.

DESCRIPTION OF PRIOR ART

Known gas cooking appliances are for example disclosed in South African Patent Nos. 83/2501, 91/0411, 91/3216 and 95/9243.

South African Patent No. 83/2501 discloses a cooker plate assembly which includes a cooker plate and a series of support members which serve to support an article to be heated on the cooker plate assembly. The support members have radially extending wings carrying hooks at their extremities for location in apertures near the periphery of the plate. When the hooks have been located in the apertures, the support members can be locked to the plate by the burner head which nests at the inner extremities of the support members. The support members can be detached easily from the plate, allowing the assembly to be cleaned of grease and other matter falling on the assembly in use.

South African Patent No. 91/0411 discloses a cooker includes a dome which locates on a support member to form an enclosed air space. The support member is in use heated on its lower surface so that heat can be transferred to the enclosed air space to cook food in a dish which is supported on and spaced from the support member.

South African Patent No. 91/3216 discloses a support for a hot plate of a portable cooker includes a burner, a windshield, rim supporting means and a rim for supporting the hot plate.

South African Patent No. 95/9243 discloses a cooker includes a heat source, and at least one plate for location above the heat source with the plate having a plurality of apertures through which heat from the heat source can pass.

OBJECT OF THE INVENTION

It is an object of the present invention to provide a novel gas cooking appliance whereby a cooking surface is removably clamped to a burner pan. Such clamping of the cooking surface to the burner pan provides a secure and safe composite appliance in use, and facilitates storage and transport of the appliance.

A further object of the present invention is to provide a cooking appliance whereby inter-changeable cooking surfaces are provided for use with a common burner pan.

SUMMARY OF THE INVENTION according to the invention a gas cooking appliance comprises a concave burner pan having a base and a peripheral side wall which forms a windshield and a gas burner disposed within the concavity of the pan, and an engagement formation adapted to mate with a corresponding engagement formation on a cooking surface, whereby such surface is releasably secured to the burner pan.

Further according to the invention, the engagement formation is in the form of a projection behind which a catch formation is adapted to engage. Preferably at least two engagement formations will be provided opposed to one another, and such formations will preferably be disposed on the lower surface of the base, on the side thereof opposed to the burner.

Preferably also the engagement formations will be defined by opposed handle members which are secured to the burner pan, preferably the base thereof.

In the preferred form of the invention four engagement formations are provided, with one pair of engaging formations being provided diametrically opposed to the other pair of engagement formations.

Also according to the invention, the burner pan may include locating means for a container for collecting fat or other liquid produced by the cooking surface. Preferably the container is in use suspended from the locating means. Such locating means preferably comprise spaced, parallel guide rails which engage opposed slots or a peripheral outwardly projected lip of the container. It is envisaged that the burner pan will define a pathway for conveying fat from a drip pan to the container. Thus the locating means for the container is preferably provided in alignment with the aperture.

In one arrangement the engagement formations, and the container locating means may be integrally formed with one another, and with the handles secured to the burner pan.

Also according to the invention, the base of the burner pan may have an indentation in the zone above the container locating means to facilitate insertion of the cup into the cup locating means.

The invention further provides that the base of the burner pan and the gas burner itself have sockets in register with one another into which a pipe can project to convey combustible gas to the burner.

Further according to the invention, the burner pan includes spaced support formations for a drip tray or a cooking surface, such support formations being disposed within the concavity of the burner pan. Preferably also the burner pan will include orientation means for orientating a drip tray relative to the base. The spaced support formations will preferably be located above the orientating means. The support formations and the orientation means may comprise projections which are pressed out of the peripheral windshield of the burner pan. The support formations preferably extend upwardly and the orientation means extend radially inwardly. It is envisaged that the orientation means will mate with corresponding formations on the drip tray so that the latter will be held in a predetermined position relative to the base of the burner pan.

A further aspect of the invention comprises a cooking surface in the form of a grid, adapted for use with the burner pan disclosed above, comprising a lower deflector plate adapted to be located within the concavity of the burner pan; an upper deflector plate located on the lower deflector plate; a cooking grid located above the upper deflector plate; and securing means for removably securing the grid to the burner pan with the lower and upper deflector plates sandwiched between the grid and the burner pan.

Further according to this aspect of the invention, each deflector plate preferably has a plurality of apertures each surrounded on their upper surfaces by a raised zone, with the apertures of the lower deflector plate being out of register with the apertures of the upper deflector plate. Preferably the lower deflector plate has a central zone, located directly above a burner of the burner pan, which is unperforated.

The upper surfaces of the perforated portion of the deflector plates may be convex so that fat or other liquid will run towards the peripheries of these surfaces.

The lower deflector plate may have a circumferentially extending drip tray. The drip tray is preferably surrounded by a sidewall. The drip tray may have an aperture through which fat or liquid may be discharged.

The lower deflector plate may have two oppositely disposed recesses in the periphery thereof to accommodate the securing means when the latter secures the grid to the burner pan.

It is further envisaged that the burner pan may have spacers for spacing the lower deflector plate from the burner pan.

According to another aspect of the invention a kit for a cooker includes lower and upper deflector plates and a grid as described above.

The scope of the invention extends separately to the lower deflector plate, the upper deflector plate and to the grid.

Also included within the scope of the invention is a cooking surface in the form of a cooking plate adapted for use with the burner pan disclosed above, comprising a cooking plate and a drip tray, the cooking plate having clip formations which in use clip the cooking plate to the burner pan with the drip tray being sandwiched between the cooking plate and burner pan. Also according to this aspect of the invention, the drip tray is preferably in the form of an annular trough which is receivable within the concavity of the burner pan, with a central aperture in the drip tray accommodating the gas burner of the burner pan.

A further feature of the drip tray comprises an aperture through which fat or other liquid in the drip tray may be discharged.

Also according to the invention the cooking plate has a cooking surface with a plurality of spaced ridges thereon. The lower surface of the plate may have at least one downwardly extending peripheral reinforcing lip formation. The lip preferably extends in a continuous circle. Preferably an outer and an inner lip are provided, the outer lip being located along the periphery of the plate and the inner lip being located towards the periphery of the plate.

According to another aspect of the invention a kit for a cooking appliance includes a cooking plate, drip tray and burner pan, the cooking plate having a thickness of between 3,5 mm and 6 mm.

The scope of the invention extends separately to the cooking plate and separately to the drip tray.

DESCRIPTION OF DRAWINGS

The invention will now be described by way of a non-limiting example with reference to the accompanying drawings in which:

FIG. 1 is a perspective view from above of a burner pan according to the invention;

FIG. 2 is an enlarged view of part of FIG. 1;

FIG. 3 is a perspective view from below of the burner pan in FIG. 1;

FIG. 18b is a plan view of the plate in FIG. 18a;

FIG. 22a is a plan view of a plate forming part of the appliance in FIG. 22;

FIG. 22b is a side view of the plate in FIG. 22a;

FIG. 22c is a section of portion of the plate in FIG. 22a;

FIG. 22d is a cross-section on lines VIII—VIII in FIG. 22a;

FIG. 22e is a side view of a handle forming part of the plate in FIG. 22a;

FIG. 22f is a view from below the plate in FIG. 22a;

FIG. 22g is a plan view from above of a drip plate forming part of the appliance in FIG. 22;

DESCRIPTION OF A PREFERRED EMBODIMENT

Figure 4:
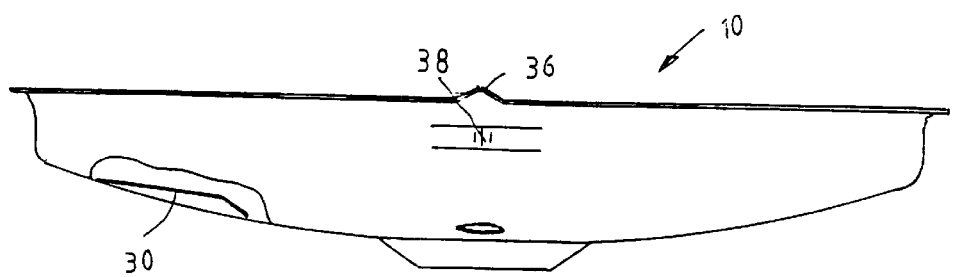
FIG. 4 is a side view of the burner pan in FIG. 1.

Referring to the drawings, a concave burner pan 10 has a base 10a and peripheral upwardly extending lip formation which together constitute a windshield shown at 14. A gas burner 12 is centrally located within the windshield 14. The windshield 14 has two opposed handles 16. The handles 16 are secured to a metal pressings 18.1 and 18.2, which are mounted on the burner pan 10. Each pressings 18.1 and 18.2 has two engagement formations which mate with clips defined by cooking surfaces which are described in more detail below.

The two engagement formations consist of a ridge 20 and two projections 22, FIGS. 6 to 11. An upwardly projecting flap 24 extends from the ridge 20 to facilitate engagements of the clips with the ridge 20.

Figure 9:
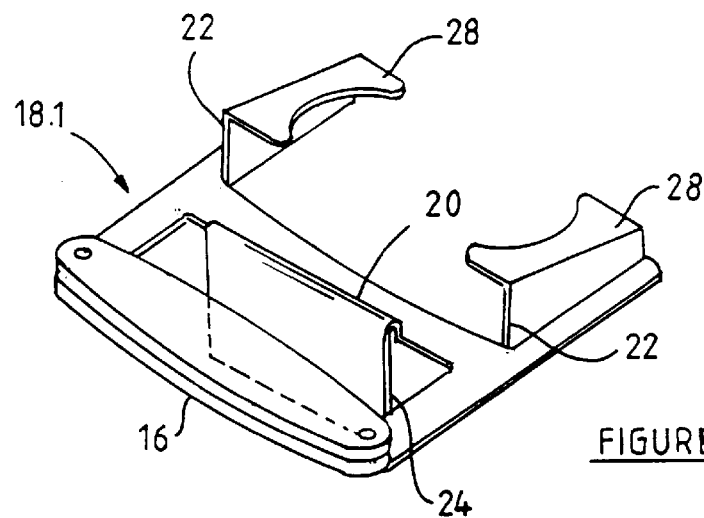
FIG. 9 is a perspective view of a handle, clip engaging means and cup holder for location on the other side of the burner pan in FIG. 1.
Figure 10:
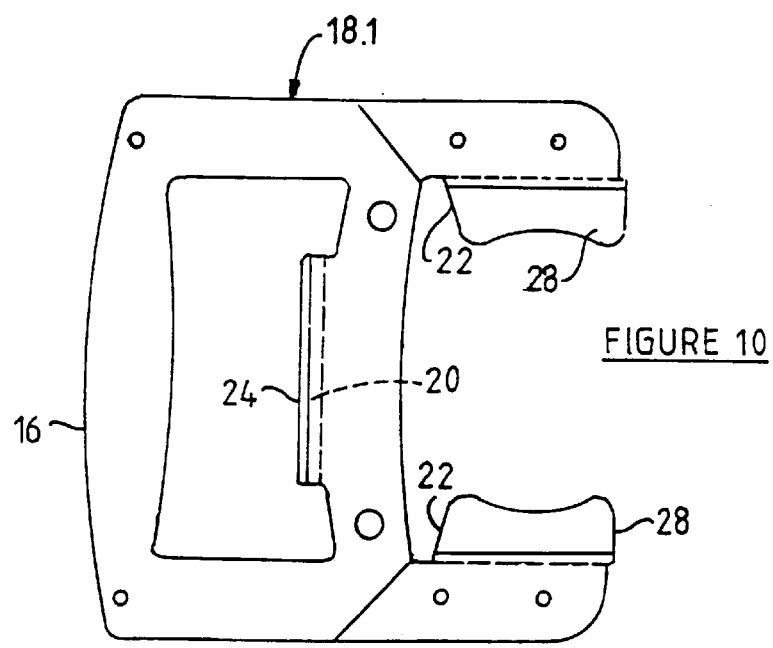
FIG. 10 is a plan view of FIG. 9.
Figure 11:
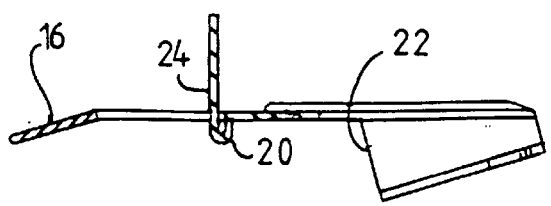
FIG. 11 is a side view of FIG. 9.
Figures 17, 18:
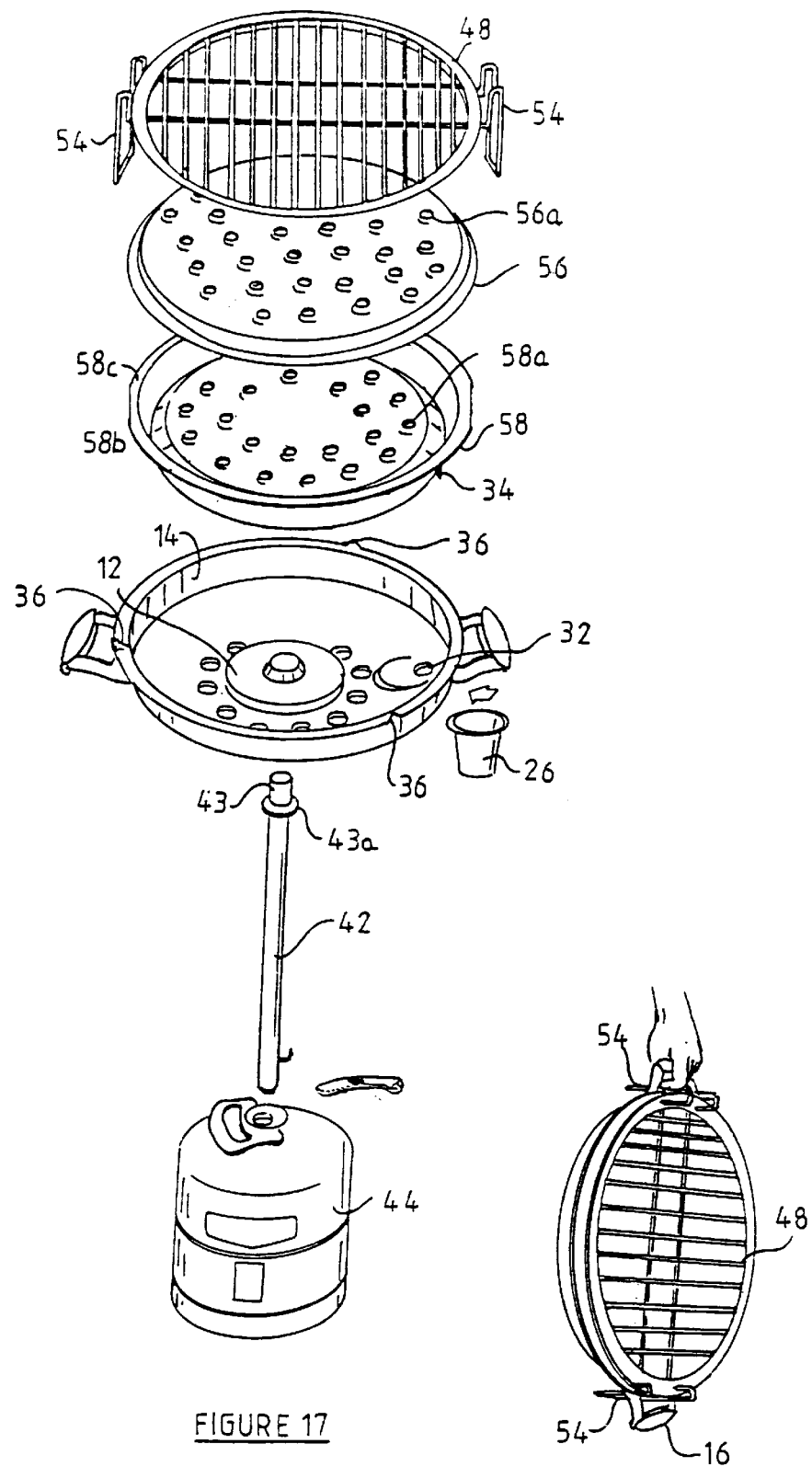
FIG. 17 is an exploded perspective view of a cooking appliance in accordance with the invention with a cooking surface in the form of a grid.
FIG. 18 is a perspective view of a grid and apertured plates clipped to a burner pan forming part of the appliance in FIG. 17.

The metal pressing 18.1, FIGS. 9 to 11, also defines a holder for a drip cup 26, FIG. 17. The holder consists of two spaced support guides 28 which engage below a peripherally extending lip on the mouth of the cup 26. In order to accommodate the upper portion of the cup 26, the windshield 14 has an indentation 30, FIG. 3, above the supports 28 to facilitate insertion of the cup 26 between the supports 28 and the windshield 14. A hole 32 for a drip tube 34 is provided in the indentation 30. It is envisaged that in certain cases the drip tube 34 could be dispensed with as described in more detail below.

The metal pressing 18.2 on the other hand is not designed to support the cup 26 because the distance between its lips 28.1 is greater than the diameter of the mouth of the cup 26.

Figures 22, 23:
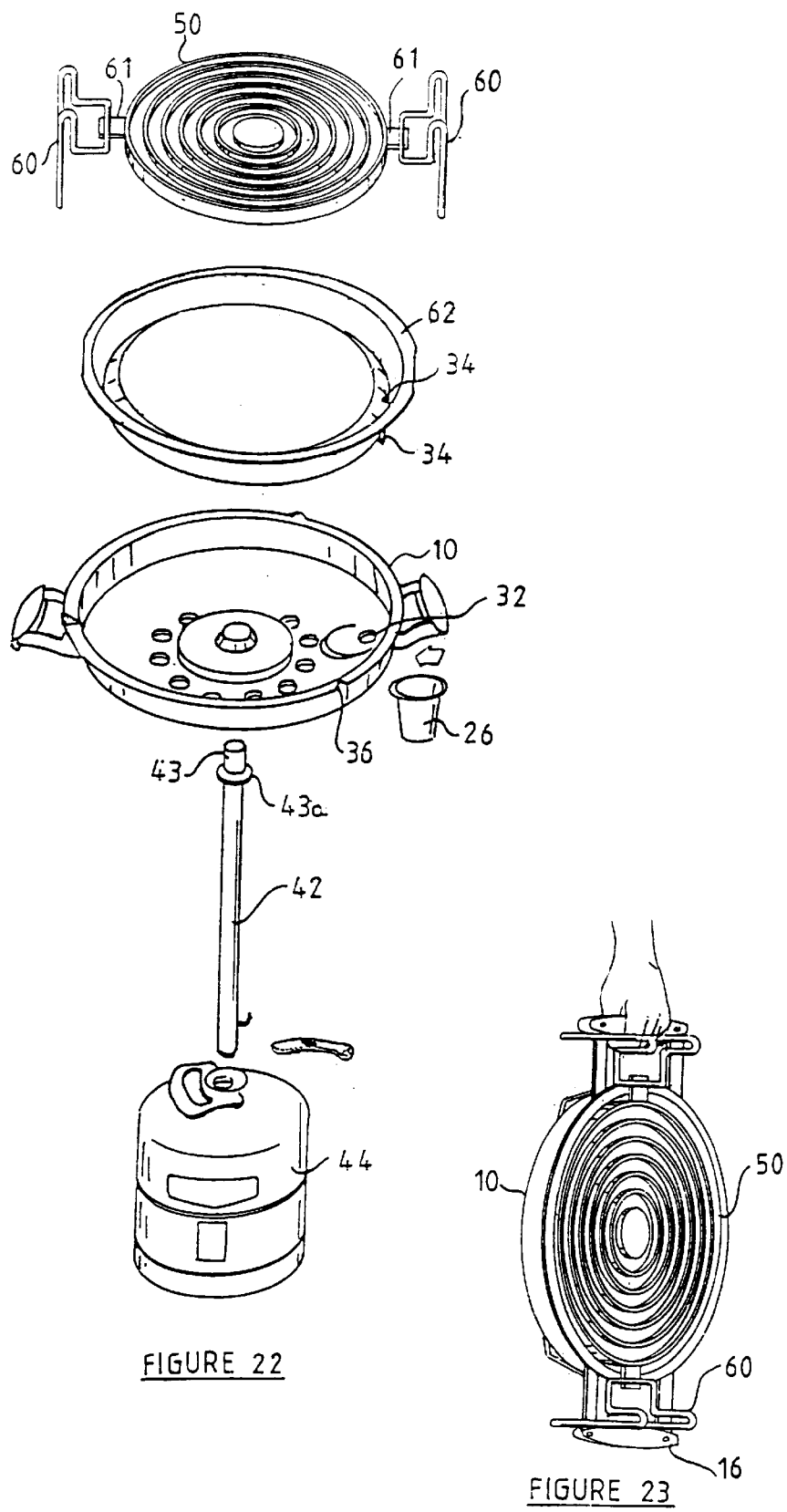
FIG. 22 is an exploded perspective view of a cooking appliance in accordance with the invention with a cooking surface in the form of a plate.
FIG. 23 is a perspective view of a plate and a drip plate clipped to a burner pan forming part of the appliance in FIG. 22.
Figure 22:
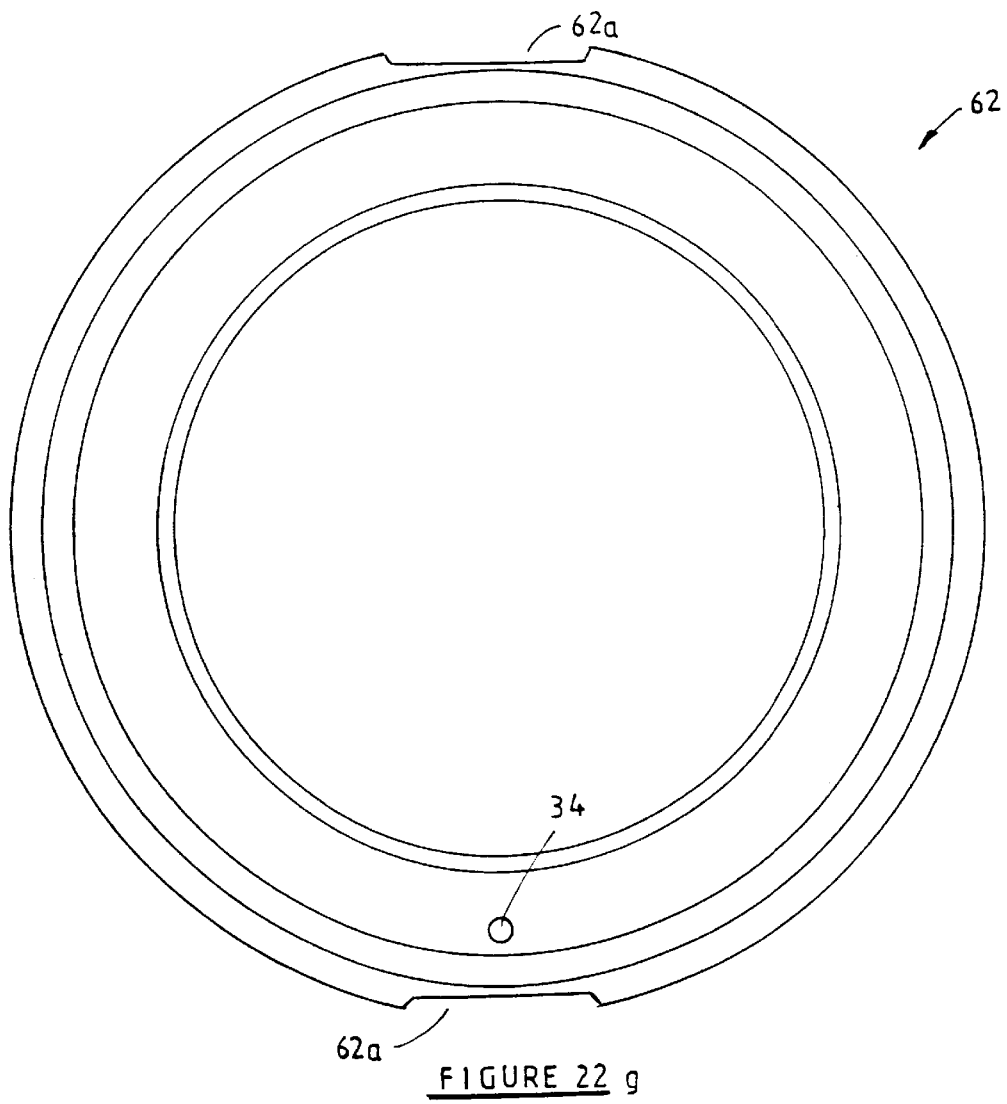
Figure 22H:
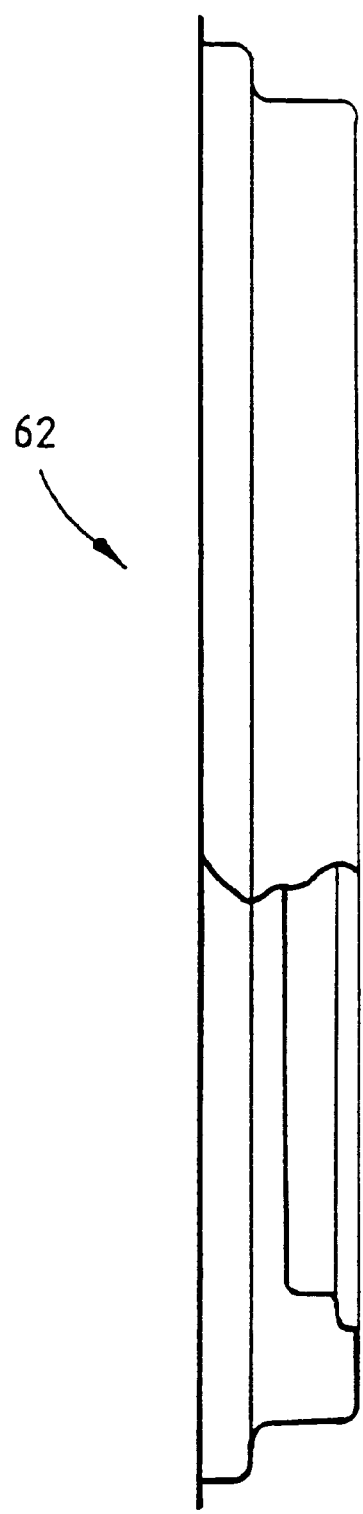
FIG. 22h is a partially sectioned side view of the drip plate in FIG. 22g.

The windshield 14 further has vertically extending supports 36 and corresponding radially inwardly directed locating lugs 38 for a drip tray 58, 62, FIGS. 17, 22. The supports 36 and lugs 38 are preferably out of the windshield 14. The supports 36 thus raise the drip tray above the upper surface of the windshield 14, while the lugs 38 serve to centralise the drip tray within the burner pan 10.

Figure 22I:
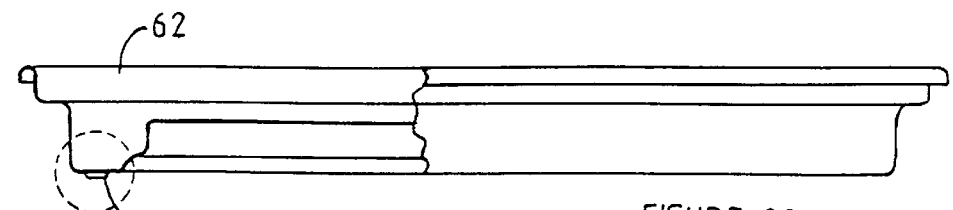
FIG. 22i and FIG. 22j are a plan view from above and a partially sectioned side view respectively of alternative arrangements to those shown in FIGS. 22g and 22h.
Figure 22J:
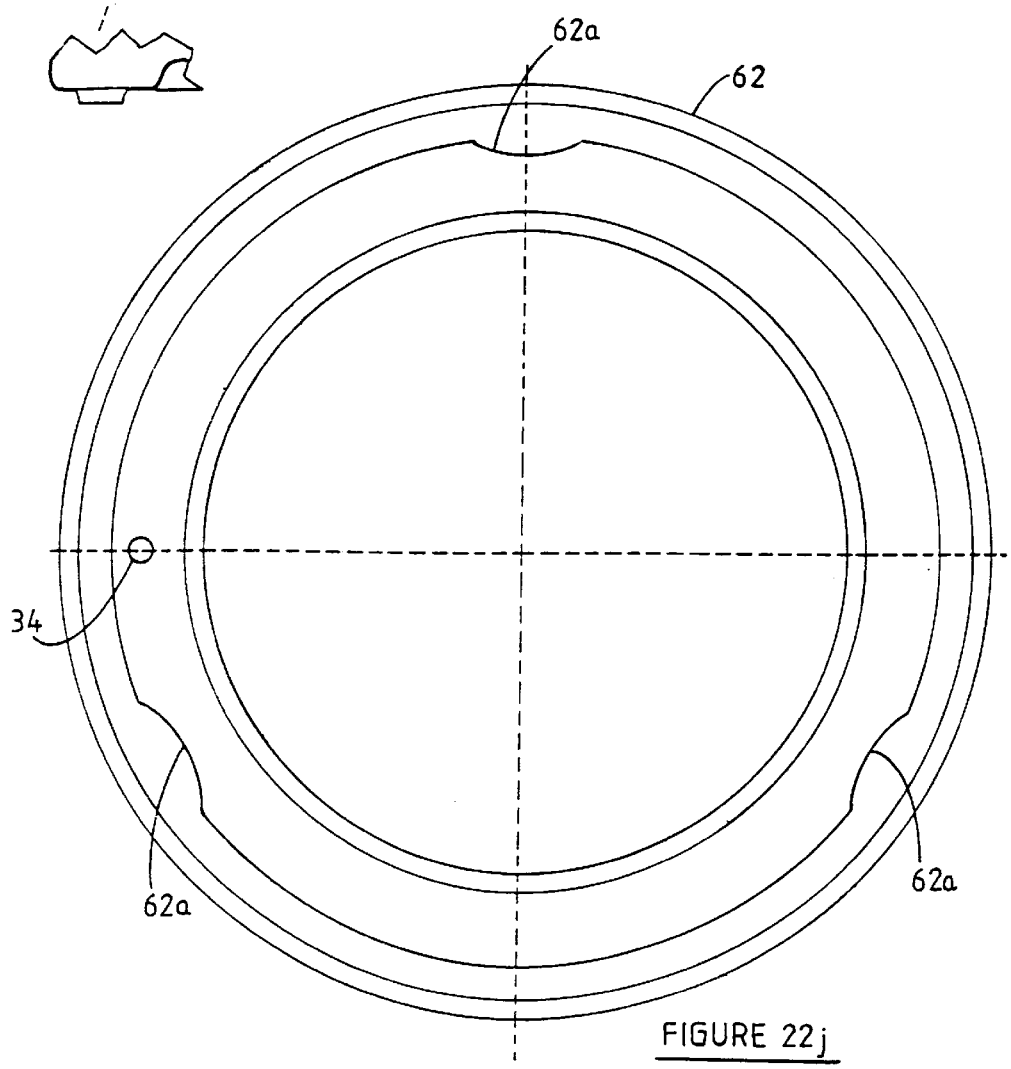
Figure 24:
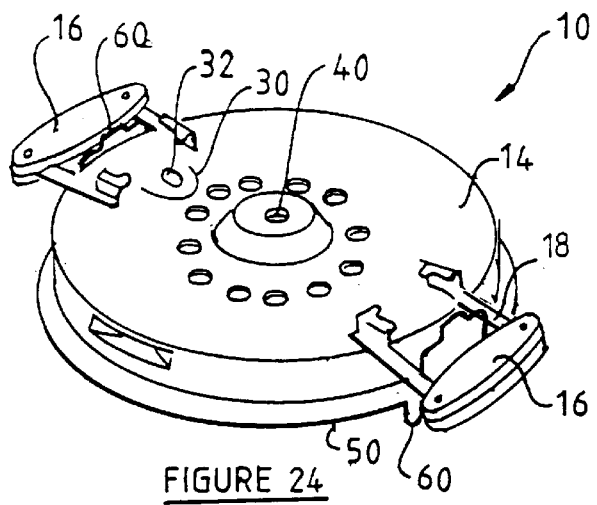
FIG. 24 is a view from below of FIG. 19.
Figure 25:
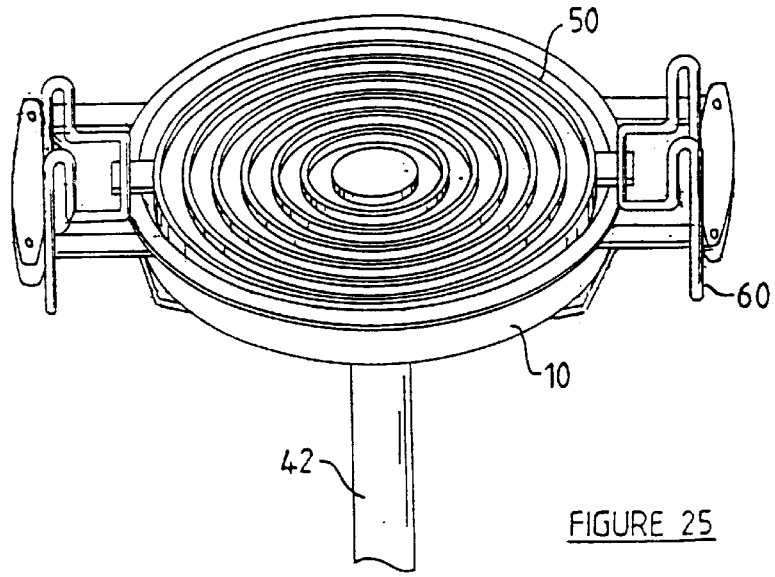
FIG. 25 is an assembled perspective view of the cooking appliance of FIG. 22 excluding a gas cylinder.
Figure 26:
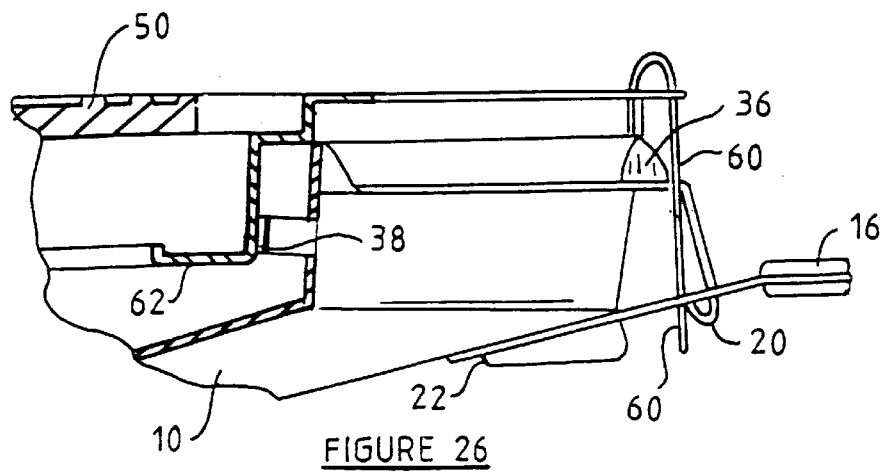
FIG. 26 is a cross-sectional side view of part of the cooking appliance of FIG. 22.

In an alternative arrangement shown in FIGS. 4a, 5a, 22i and 22j, indentations in the side walls of the windshield 14 serve both the above purposes, and in addition, act to orientate the drip tray 58, 62 within the burner pan 10 so that liquid in the drip trays 58, 62, can be discharged therefrom through aligned apertures 34 and 32 as described in more detail below. Thus, a drip tray as shown in FIGS. 22i and 22j, will be provided with corresponding orientating formations 62a which engage in the inwardly directed protrusions 38, FIG. 5a, in order to orientate the drip pan 62 relative to the burner pan 10.

The windshield 14 and the gas burner 12 have sockets 40 in register with one another into which a gas pipe 42 can project. The gas pipe 42 has a cap formation 43 which includes a circumferential collar or flange 43a which abuts the bottom of the burner pan and limits the extent to which the pipe projects into the socket 40 of the gas burner 12. The other end of the gas pipe 42 is adapted to be connected to a gas bottle 44.

Figure 12:
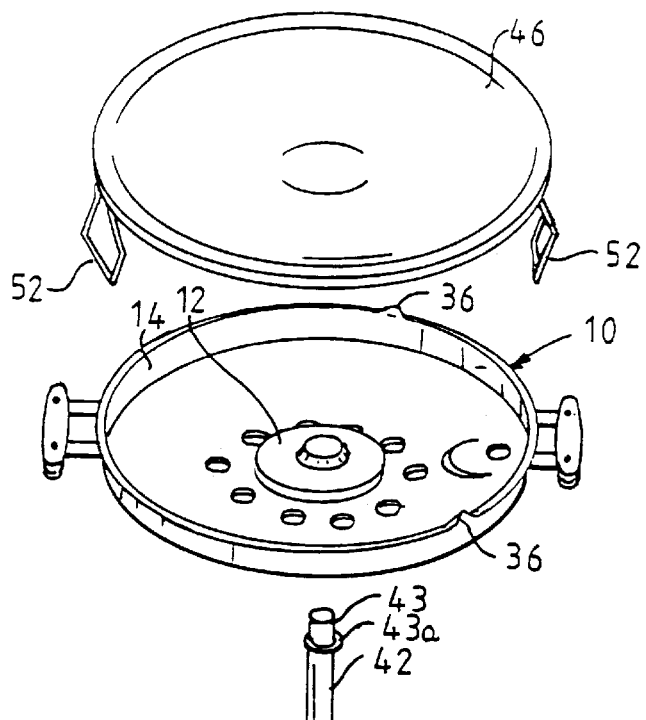
FIG. 12 is an exploded perspective view of a cooking appliance in accordance with the invention with a dished cooking surface.
Figure 13:
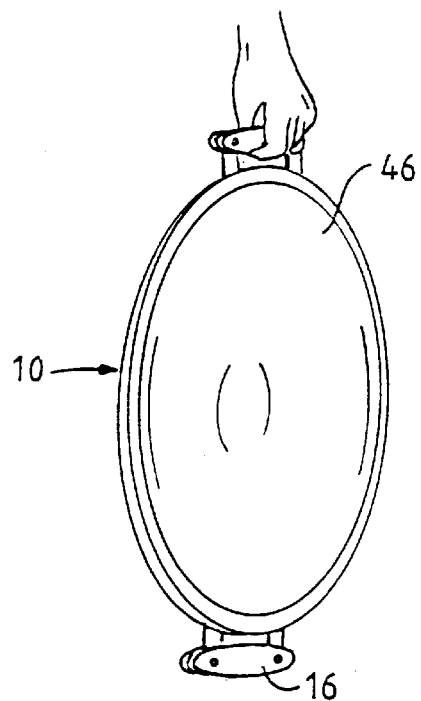
FIG. 13 is a perspective view of a dished cooking surface clipped to a burner pan forming part of the appliance in FIG. 12.
Figure 14:
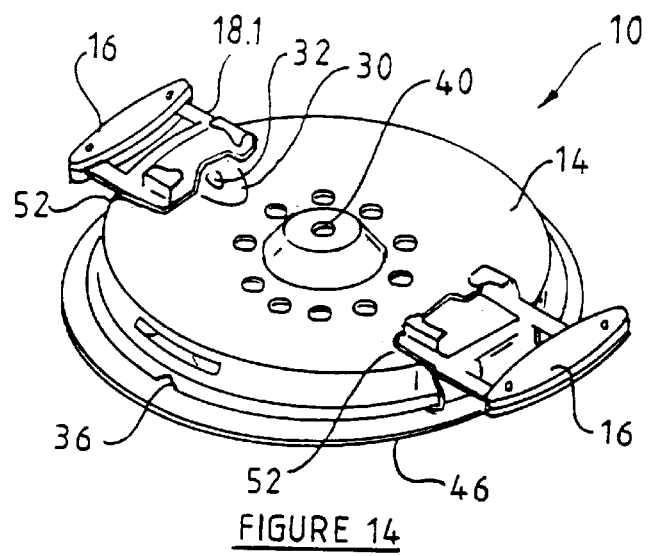
FIG. 14 is a view from below of FIG. 13.
Figure 15:
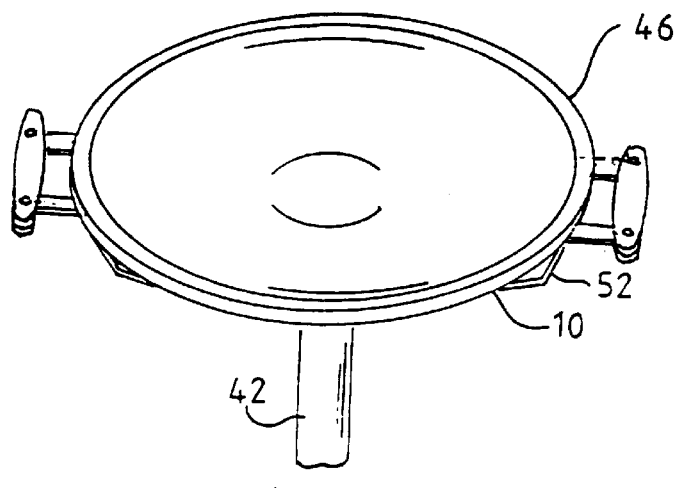
FIG. 15 is an assembled perspective view of the cooking appliance of FIG. 12 excluding a gas cylinder.
Figure 16:
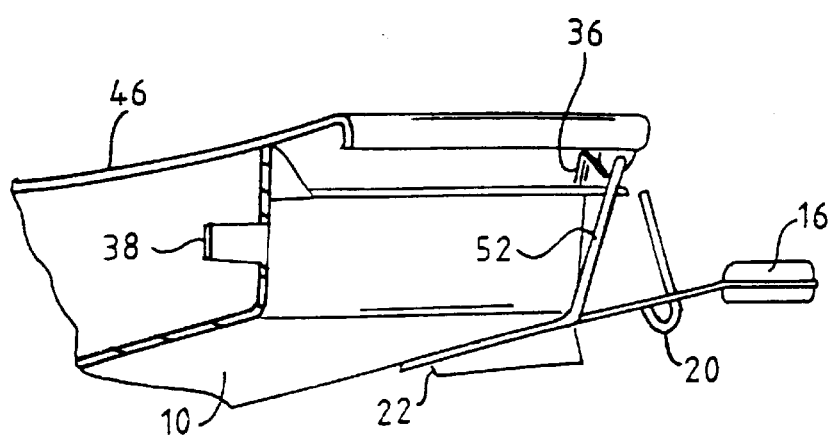
FIG. 16 is a cross-sectional side view of part of the cooking appliance of FIG. 12.

The burner pan 10 can be used with cooking surfaces in the form of a dish 46, FIG. 12, a grid 48, FIG. 17, or a plate 50 of cast iron, aluminium or pressed steel, FIG. 22.

The dish 46 has clips 52 which can be removably clipped behind the upright surfaces 22 of the metal pressing 18.1 and 18.2 for transport and storage purposes.

Figure 18A:
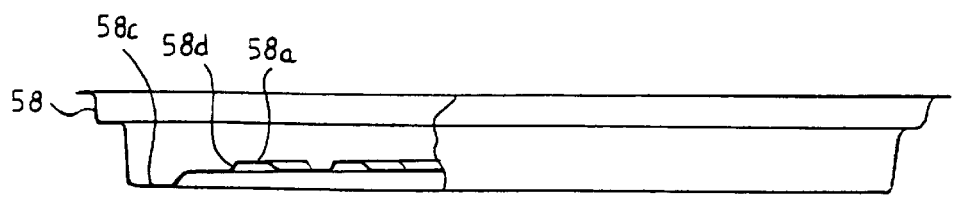
FIG. 18a is a partially broken-away side view of a lower apertured plate forming part of the appliance in FIG. 17.
Figure 18B:
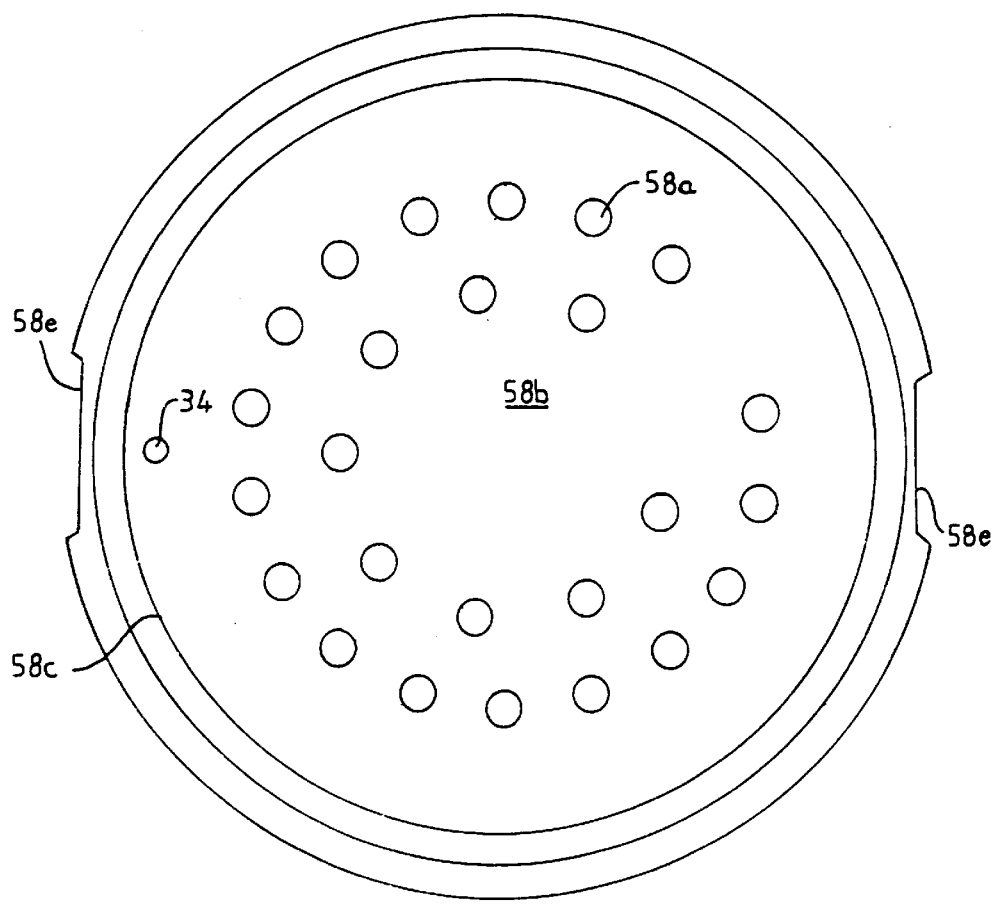
Figure 18C:
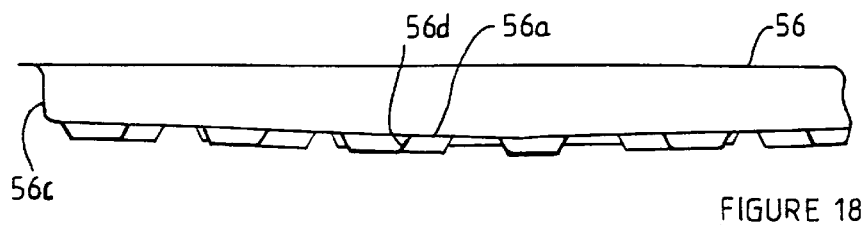
FIG. 18c is portion of a side view of an upper apertured plate forming part of the appliance in FIG. 17.
Figure 18D:
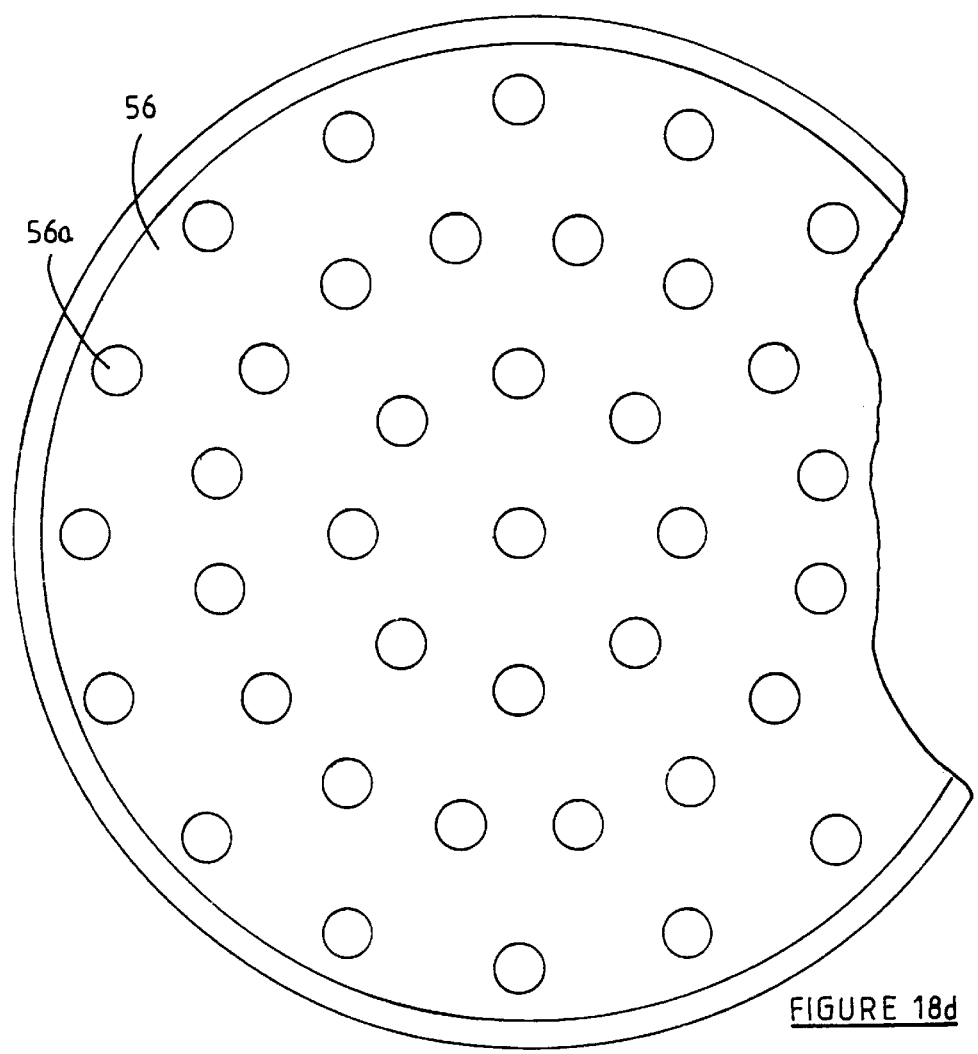
FIG. 18d is a view from below of the plate in FIG. 18c.
Figure 19:
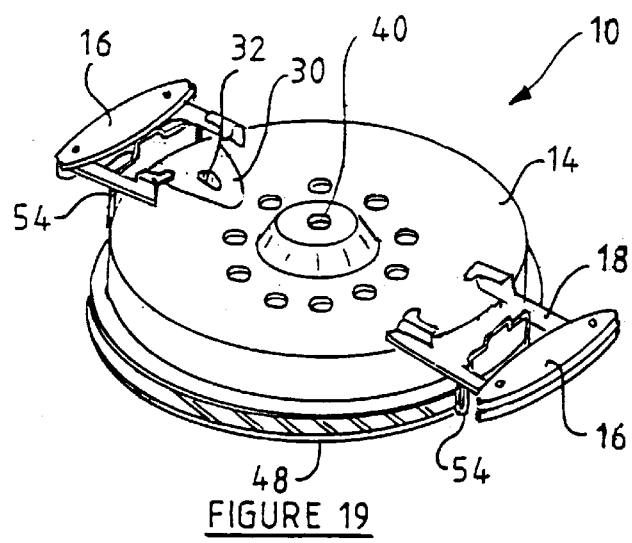
FIG. 19 is a perspective view from below of FIG. 18.
Figure 20:
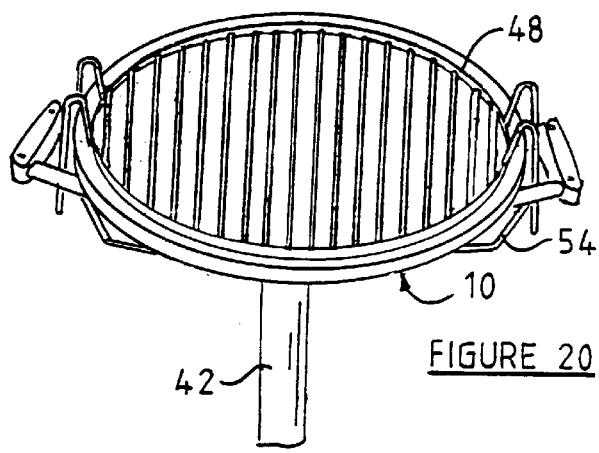
FIG. 20 is an assembled perspective view of the cooking appliance of FIG. 17 excluding a gas cylinder.
Figure 21:
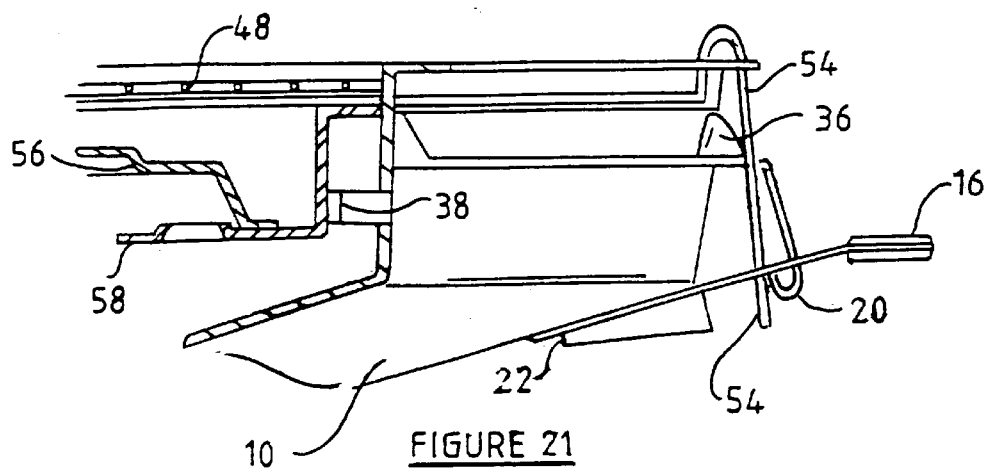
FIG. 21 is a cross-sectional view of part of the cooking appliance of FIG. 17.

With reference to FIG. 17, the grid 48 has clips 54 which are adapted to be removably clipped behind the ridges 20 of the metal pressings 18.1 and 18.2 for transport and storage purposes. In the clipped position, two apertured deflector plates 56 and 58 are sandwiched between the grid 48 and the burner pan 10. The lower deflector plate 58 has a plurality of apertures 58a each surrounded by a raised peripheral lip 58d, FIG. 18a. A central zone 58b which overlies the burner 12, is free of perforations as shown in FIG. 18b. acts as a drip tray for the collection of fat or other liquid produced in use. The drip tray 58c includes an aperture 34 through which liquid in the collection zone 58c may drain. In use the aperture 34 will align with the aperture 32 in the burner pan 10 so that liquid wil drain through the apertures 34 and 32 into the drip cup 26.

Figure 5:
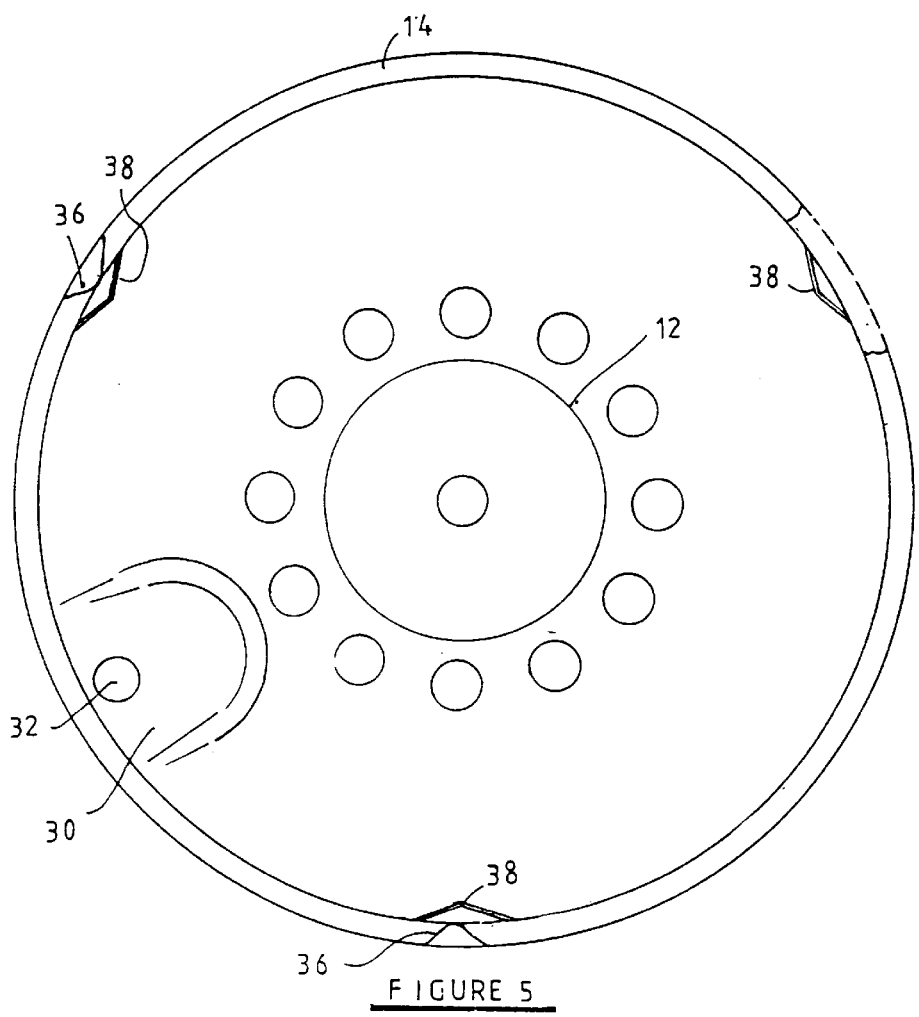
FIG. 5 is a plan view of the burner pan in FIG. 1.
Figure 5A:
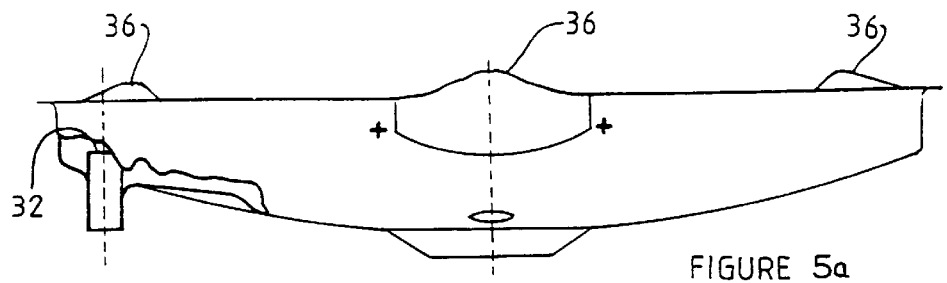
FIGS. 5a and 5b are a side view and plan view of alternative arrangements to those shown in FIG. 4 and FIG. 5 respectively.
Figure 5B:
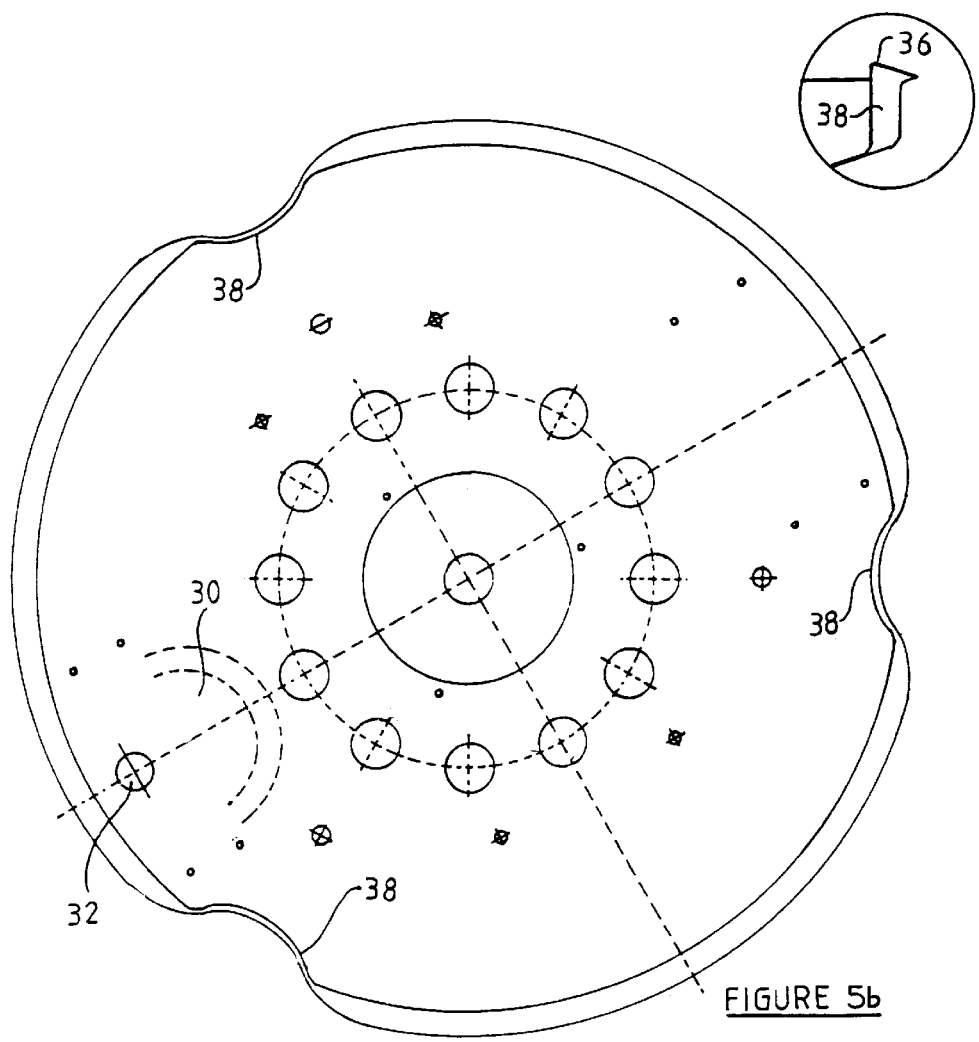
Figure 6:
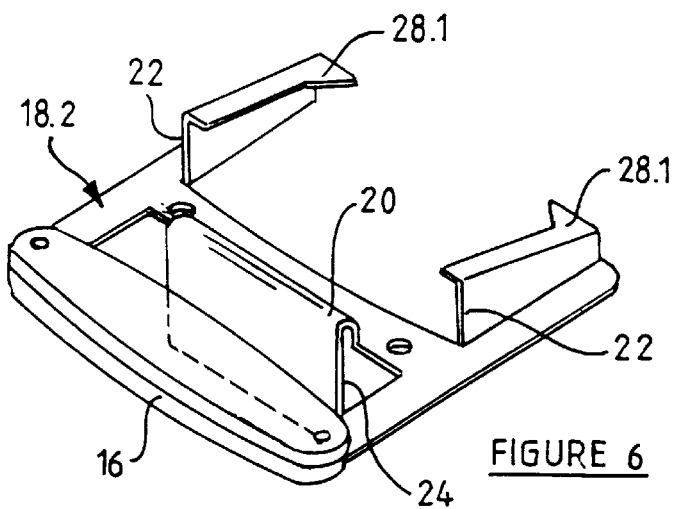
FIG. 6 is a perspective view of a handle and clip engaging means for location on one side of the burner pan in FIG. 1.
Figure 7:
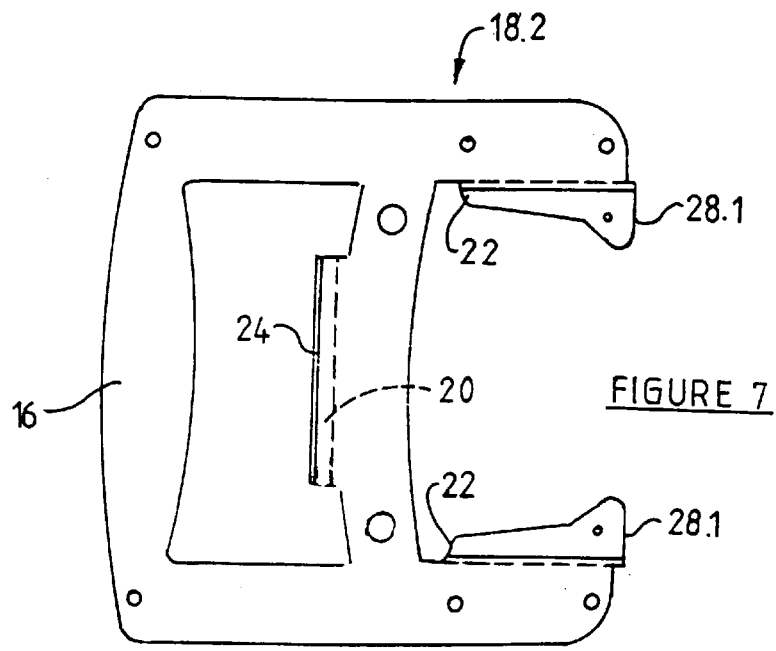
FIG. 7 is a plan view of FIG. 6.
Figure 8:
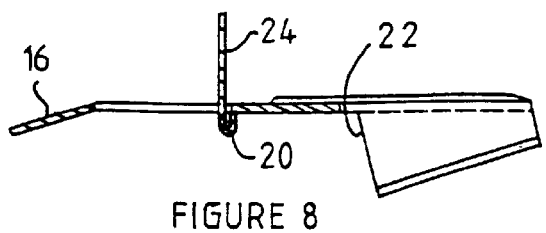
FIG. 8 is a side view of FIG. 6.

The lower deflector plate 58 is further provided with a peripheral side wall which fits snugly into the concavity of the burner pan 10 and which is supported by the support formations 36. With reference to FIGS. 4a and 5a, the side wall of the lower deflector plate could have formations, not shown, which engage in the orientation formations 38 of the burner pan, so that the lower deflector plate 58 will be positioned in a predetermined orientation relative to the burner pan 10, to ensure that the apertures 32 and 34 are in alignment. The lower deflector plate further includes two opposed recesses 58e which permit passage of the clip members 54 of the grid 48.

As mentioned above, the arrangement includes an upper deflector plate 56 which is likewise provided with a plurality of apertures 56a, also each surrounded by a raised peripheral lip 56d. In use the upper deflector plate 56, rests on a peripheral skirt 56b, which is supported by the lower deflector plate 58. Preferably the apertures 56a and 58a of the respective deflector plates 56 and 58 will be out of register with one another, so that liquid passing through the upper deflector plate 56 will be trapped by the lower deflector plate 58. Because the apertures 56a and 58a are not in register, heat from the gas burner 12 is also conveyed in a serpentine pass through the deflector plates 58 and 56, so that food above the deflector plates is cooked by convection and radiated heat.

The grid-type cooking appliance described above can be replaced by a plate-type cooker utilising the same burner pan 10. With reference to FIG. 22, a cast iron plate 50 has clips 60 which can be removably clipped behind the ridges 20 of the metal pressings 18.1 and 18.2 for transport and storage purposes. In the clipped position, a drip tray 62 is sandwiched between the plate 50 and the burner pan 10. The drip tray 62 is in the form of an annular trough and provided with an aperture 34 through which fat and other liquid collected in the drip tray 62 may be discharged. With reference to FIG. 22J, orientation formations 62a on the drip tray 62, are adapted to mate with the formations 36 on the burner pan 10, FIGS. 4A and 5A to ensure that the drip tray 62 is positioned relative to the burner pan 10, so that the aperture 34 aligns with the aperture 32 in the burner pan 10, so that liquid will be discharged through these apertures 34, 32, into the drip cup 26. It will further be noted that opposed recesses 62a, FIG. 22g, are provided for passage of the clip formation 60 on the plate 50.

The invention provides for the clips 60 to be rotatably mounted on opposed radially directed swivel pins 61, so that the plate 50 can be inverted in order to use either surface thereof for cooking purposes.

With reference to FIG. 23a, the cooking plate 50 has a cooking surface with a plurality of ridges 50a disposed thereon in a concentric pattern as illustrated. The reverse surface of the cooking plate 50 is planar, and has two reinforcing lips 30 and 32 at the outer periphery thereof. It is envisaged that the cooking plate 50 will have a thickness, excluding the ridges, of 4 mm. This thickness and has the advantage of reduced weight and material usage.

It will be appreciated that many modifications or variations of the invention are possible without departing from the spirit or scope of the invention.

What is claimed is:

1. A gas cooking appliance comprising a concave burner pan having a base and a peripheral side wall which together form a windshield and a gas burner within the concavity of the pan, and an engagement formation adapted to mate with a corresponding engagement formation on a cooking surface whereby such surface is releasably secured to the burner pan, said burner pan including locating means for a container for collecting liquid produced on the cooking surface in use, wherein said engagement formations and said locating means for the container are defined by handles which are secured to the burner pan.

2. A gas cooking appliance comprising a concave burner pan having a base and a peripheral side wall which together from a windshield and a gas burner disposed within the concavity of the pan, and an engagement formation adapted to mate with a corresponding engagement formation on a cooking surface, whereby such surface is releasably secured to the burner pan, said burner pan including locating means for a collecting liquid produced on the cooking surface in use, wherein the base of the burner pan includes an indention in a zone above the container locating means for facilitating location of the container in the location means.

3. A gas cooking appliance comprising a concave burner pan having a base and a peripheral side wall which together form a windshield and a gas burner disposed within the concavity of the pan, and an engagement formation adapted to mate with a corresponding engagement formation on a cooking surface, whereby such surface is releasably secured to the burner pan, said cooking surface being in the form of a grid comprising a lower deflector plate adapted to be located within the concavity of the burner pan; an upper deflector plate located on the lower deflector plate; a cooking grid located above the upper deflector plate; and securing means for removably securing the grid to the burner pan with the lower and upper deflector plates sandwiched between the grid and the burner pan.

4. The appliance according to claim 3 wherein each deflector plate has a plurality of apertures which define peripheral upwardly extending lip formations.

5. The appliance according to claim 4 wherein the apertures of the lower deflector plate are out of register with the apertures of the upper deflector plate.

6. The appliance according to claim 5 wherein the lower deflector plate has a central zone which overlies the burner of the burner pan, and which is free of apertures.

7. The appliance according to claim 3 wherein the upper surfaces of the deflector plates are convex so that liquid produced in use will run towards the peripheries of these surfaces.

8. The appliance according to claim 3 wherein the lower deflector plate is provided with a circumferentially extending drip tray in the form of a peripheral trough formation.

9. The appliance according to claim 8 wherein the drip tray includes an aperture through which liquid may be discharged.

10. The appliance according to claim 3 wherein the lower deflector plate defines opposed recesses in the periphery thereof to accommodate the securing means when the latter secures the grid to the burner pan.

11. A gas cooking appliance comprising a concave burner pan having a base and a peripheral side wall which together form a windshield a gas burner disposed within the concavity of the pan, and an engagement formation adapted to mate with a corresponding engagement formation on a cooking surface, whereby such surface is releasably secured to the burner pan, said cooking surface comprising a cooking plate and a drip tray, the cooking plate having clip formations which in use clip the cooking plate to the burner pan with the drip tray sandwiched between the cooking plate and burner pan.

12. The appliance according to claim 11 wherein the drip tray is in the form of an annular trough which is receivable by the burner pan, with a central aperture in the drip tray accommodating the gas burner of the burner pan.

13. The appliance according to claim 11 wherein the drip tray includes an aperture through which liquid in the drip tray may be discharged.

14. The appliance according to claim 11 wherein the cooking plate has a cooking surface with a plurality of spaced ridges thereon.

15. The appliance according to claim 11 wherein the cooking plate defines a lower surface which has at least one downwardly extending peripheral reinforcing lip formation.

16. The appliance according to claim 15 wherein a pair of concentric reinforcing lip formations are provided, with an outer lip formation being disposed at the periphery of the plate.

17. The appliance according to claim 11 wherein the clip means are movable to enable such clip means selectively to extend laterally from either surface of the cooking plate to engage the burner pan, thereby to enable the cooking plate to be inverted selectively to utilise both surfaces thereof.

18. The appliance according to claim 17 wherein a pivot or hinge is provided on the cooking plate at opposed peripheral locations, for movably mounting the clip formations to the cooking plate.

19. The appliance according to claim 11 wherein the cooking plate has a thickness of between 3.5 mm and 6 mm.

20. A cooking surface adapted for use with a gas cooking appliance comprising a concave burner pan having a base and a peripheral side wall which together form a windshield and a gas burner disposed within the concavity of the pan, and an engagement formation adapted to mate with a corresponding engagement formation on a cooking surface, whereby such surface is releasably secured to the burner pan, said cooking surface comprising a lower deflector plate adapted to be located within the concavity of the burner pan; an upper deflector plate located on the lower deflector plate; a cooking grid located above the upper deflector plate; and securing means for removably securing the grid to the burner pan with the lower and upper deflector plates sandwiched between the grid and the burner pan.

21. The cooking surface according to claim 20 wherein each deflector plate has a plurality of apertures which define peripheral upwardly extending lip formations.

22. The cooking surface according to claim 21 wherein the apertures of the lower deflector plate are out of register with the apertures of the upper deflector plate.

23. The cooking surface according to claim 22 wherein the lower deflector plate has a central zone which overlies the burner of the burner pan, and which is free of apertures.

24. The cooking surface according to claim 20 wherein the upper surfaces of the deflector plates are convex so that liquid produced in use will run towards the peripheries of these surfaces.

25. The cooking surface according to claim 20 wherein the lower deflector plate is provided with a circumferentially extending drip tray in the form of a peripheral trough formation.

26. The cooking surface according to claim 25 wherein the drip tray includes an aperture through which liquid may be discharged.

27. The cooking surface according to claim 20 wherein the lower deflector plate defines opposes recesses in the periphery thereof to accommodate the securing means when the latter secures the grid to the burner pan.

28. A cooking surface adapted for use with a gas cooking appliance comprising a concave burner pan having a base and a peripheral side wall which together form a windshield and a gas burner disposed within the concavity of the pan, and an engagement formation adapted to mate with a corresponding engagement formation on a cooking surface, whereby such surface is releasably secured to the burner pan, said cooking surface comprising a cooking plate, and a drip tray, the cooking plate having clip formations which in use clip the cooking plate to the burner pan of the appliance with the drip tray sandwiched between the cooking plate and burner pan.

29. The cooking surface according to claim 28 wherein the drip tray is in the form of an annular trough which is receivable by the burner pan, with a central aperture in the drip tray accommodating the gas burner of the burner pan.

30. The cooking surface according to claim 28 wherein the drip tray includes an aperture through which liquid in the drip tray may be discharged.

31. The cooking surface according to claim 28 wherein the cooking plate has a cooking surface with a plurality of spaced ridges thereon.

32. The cooking surface according to claim 28 wherein the cooking plate defines a lower surface which has at least one downwardly extending peripheral reinforcing lip formation.

33. The cooking surface according to claim 32 wherein a pair of concentric reinforcing lip formations are provided, with an outer lip formation being disposed at the periphery of the plate.

34. The cooking surface according to claim 28 wherein the clip means are movable to enable such clip means selectively to extend laterally from either surface of the cooking plate to engage the burner pan, thereby enabling the cooking plate to be inverted selectively to utilise both surfaces thereof.

35. The cooking surface according to claim 34 wherein a pivot or hinge is provided on the cooking plate at opposed peripheral locations, for movably mounting the clip formations to the cooking plate.

36. The appliance according to claim 28 wherein the cooking plate has a thickness of between 3.5 mm and 6 mm.

37. A gas cooking appliance comprising a concave burner pan having a base and peripheral side wall which together form a windshield and a gas burner disposed within the concavity of the pan, and an engagement formation adapted to mate with a corresponding engagement formation on a cooking surface, whereby such surface is releasably secured to the burner pan, said burner pan including locating means for a container for collected liquid produced on the cooking surface in use, wherein the locating means comprises spaced parallel guide rails which engage opposed slots or a peripheral outwardly projecting lip of the container, wherein said engagement formations and said locating means for the container are defined by handles which are secured to the burner pan.

38. A gas cooking appliance comprising a concave burner pan having a base and a peripheral side wall which together form a windshield and a gas burner disposed within the concavity of the pan, and an engagement formation adapted to mate with a corresponding engagement formation on a cooking surface, whereby such surface is releasably secured to the burner pan, said burner pan including locating means for a container for collecting liquid produced on the cooking surface in use, wherein the burner pan defines a pathway for conveying liquid from a drip pan to the container, wherein said engagement formations and said locating means for the container are defined by handles which are secured to the burner pan.

* * * * *

UNITED STATES PATENT AND TRADEMARK OFFICE
CERTIFICATE OF CORRECTION

PATENT NO. : 6,105,487
DATED : AUGUST 22, 2000
INVENTOR(S) : SIMON NASH

It is certified that error appears in the above-identified patent and that said Letters Patent is hereby corrected as shown below:

Col. 5, line 63, after "Fig 18b.", insert:

--The lower deflector plate 58, further includes a peripheral trough 58c which --

Signed and Sealed this

Twenty-fourth Day of April, 2001

Attest:

NICHOLAS P. GODICI

Attesting Officer

Acting Director of the United States Patent and Trademark Office